United States Patent Office 3,472,663
Patented Oct. 14, 1969

3,472,663
METHOD OF PRODUCING FREEZE-DRIED SOUR CREAM FRUIT PRODUCTS
Maruie Laskin, Milwaukee, Wis., assignor to W. R. Grace & Co., New York, N.Y., a corporation of Connecticut
No Drawing. Original application June 17, 1965, Ser. No. 464,867. Divided and this application Nov. 21, 1967, Ser. No. 684,626
Int. Cl. A23b 7/02
U.S. Cl. 99—199    4 Claims

ABSTRACT OF THE DISCLOSURE

Production of a rehydratable freeze dried sour cream-fruit or berry mixture by cooling a monolithic shape of the product at atmospheric pressure until frozen solid, dehydrating by applying heat at reduced pressure.

---

This application is a division of United States patent application Ser. No. 464,867, filed June 17, 1965 and now abandoned which in turn was a continuation-in-part of United States patent application Ser. No. 324,240, filed Nov. 18, 1963 which was later abandoned in favor of United States patent application Ser. No. 464,832, also filed June 17, 1965. This application is also related to United States patent application Ser. No. 465,835, filed June 18, 1965; and United States patent application Ser. No. 684,613, now U.S. Patent 3,419,402 filed concurrently herewith as a divisional of the aforesaid application Ser. No. 464,867.

In applications Ser. Nos. 324,240 and 464,832 there has been disclosed novel freeze-dried frozen ice milk confection products (e.g., freeze-dried, storage-stable ice cream); methods for preparing such products; and confectionery products employing such freeze-dried ice milk products as, e.g., centerpieces and/or fillers in candies and like products enrobed with chocolate or other candy coatings.

In application Ser. No. 464,835 it has been disclosed that similar drying methods can be applied to gelatin-based materials (such as the well-known flavored gelatin desserts and/or gelatin-containing puddings or pie fillings) to produce still further novel rehydratable products useful per se, or as centerpieces and/or fillers in candy products.

The present invention relates to yet further applications of the techniques disclosed in the aforesaid co-pending applications to produce still other new and useful confectionery and/or candy products. In particular, the present invention relates to freeze-dried sour cream-fruit or berry mixtures (especially sour cream-strawberry mixtures); to methods for preparing them; and to novel candy and/or cookie items incorporating such products as centerpieces, fillers and the like.

Thus in one broad aspect the present invention is directed to freeze-dried, rehydratable, storage stable, monolithic shapes of sour cream-fruit or berry mixtures, which shapes are enrobed in a surrounding exterior coating of chocolate, caramel or other like candy coating material to produce new and useful candy items.

In another broad aspect the invention is directed to certain new and useful freeze-dried, storage stable, sour cream-fruit or berry mixture products.

In another aspect the invention is directed to methods for preparing such freeze-dried, rehydratable, storage stable products; and for preparing candy items therefrom.

Typical examples of sour cream materials that can be used in the practice of the present invention are found, for example, in "The Chemical Formulary," H. Bennett (chief editor), Chemical Publishing Co., Inc., New York, N.Y., as follows:

Volume I (1933): page 65, sour cream.
Volume III (1936): pages 150–51, sour cream.
Volume IV (1939): page 130, sour cream.

It is well understood that freeze-drying techniques rely on the principle of sublimation of ice crystals and diffusion of the resulting water vapors through and out of the product. The heat of sublimation in freeze-drying processes is provided by radiation from platens or similar heat exchangers located proximate to the frozen material. Excessive heat, insufficient vacuum or direct contact of the frozen material with the heat exchanger results in thawing or conversion of the ice to water, followed by ordinary dehydration and evaporation. This causes collapse or alteration of the cell or other physical structure of the product being dried, which of course is undesirable.

In accordance with the present invention the initial cooling or freezing step should ordinarily be carried out at or about atmospheric pressure to avoid foaming of the frozen product. It is conventional practice in freeze-drying procedures to use evaporative cooling, i.e., the application of vacuum to reduce the temperature of the product. Such a technique is ordinarily not feasible in the practice of the present invention.

Accordingly, it is highly preferred in the practice of the present invention that prior to the introduction of the product to be freeze-dried into the vacuum chamber of the freeze-drying apparatus it should be cooled, while at or about atmospheric pressure, to the point where it is solidly frozen, particularly in having a hard frozen surface which, in handling and forming, is not predisposed to melt, thaw or soften. In this connection a temperature of $-10°$ Fahrenheit or preferably $-20°$ Fahrenheit or below is used, although the melt or thaw point of the particular product is variable, depending upon its formulation, i.e., the various amounts and types of ingredients (e.g., starch, sugar, etc.) therein. It should be understood, however, that once the product has been cooled to the desired point, i.e., where the entire monolith including all surfaces is frozen hard, evaporative cooling may be, and usually is, used to maintain the temperature of the undehydrated frozen portions in an unthawed state during the dehydration step.

The dehydration (freeze-drying) process is carried out under low pressures, i.e., below the vapor pressure of ice at the particular temperature of the product undergoing dehydration. Preferably the pressure should be below about 1.5 millimeters of mercury, and in the most preferred embodiments of this process, below about 1.0 millimeter of mercury (absolute). It should be further understood that the pressures referred to herein, unless otherwise indicated, are absolute pressures.

The product is heated during the dehydration step of this process by means of radiant energy which is emanated from the surface of the heat exchanger platen or surface. In the initial stages of the process, while the vacuum level is being established, little or no heat may be required, particularly if the product temperature equilibrium is being established by sublimation cooling under vacuum. When heating from outside sources is required to maintain the dehydration at an economically feasible rate, it is provided by the heat exchangers. These may be operated over a broad range of temperatures and are adjusted to provide sufficient heat to maintain sublimation or dehydration at a maximum, but not so high in temperature to cause melting or thawing of the product being dried. Preferably, but not necessarily, higher temperatures should be used in the initial stages of the dehydration and are slowly decreased in stepwise fashion as drying progresses. A broad range of heat exchanger or platen temperatures that can be employed is from about 250° Fahrenheit to about 90° Fahrenheit, and preferably between about 160° Fahrenheit and 90° Fahrenheit. The product temperature, at least with respect to the frozen undehydrated portion, should be maintained at a point where no substantial thawing takes place, i.e., about −10° Fahrenheit or less during the drying step.

The time of the process is variable but ordinarily the freeze-drying can be carried out over a period of from about one or two hours to about twenty hours. In the freeze-drying dehydration method of the present invention the product should be cut, molded or otherwise formed into monolithic slabs, balls, pieces, or sheets—preferably less than one inch thick, and in the most preferred instance about one-half inch or less in thickness. This is typically done before placement in the freeze-drying apparatus, and usually before it is frozen into a hard solid monolith to preclude foaming. Ordinarily, the thinner slabs permit the more rapid diffusion of vapor from the core of frozen material when it is being dehydrated, as well as presenting a broader sublimation interface. The products of the present invention are dried to a low moisture content, preferably less than 4 percent moisture (weight basis) and most preferably less than 1½ percent moisture.

The previously described freeze-drying method will produce a monolithic unit which can be used per se as a confection or may be used as a component thereof, such as, for example, a candy bar or piece filler, which is coated with chocolate, caramel, or like candy coating. It may also be comminuted or ground to a finely divided material which can be packaged in bags or boxes for storage or shipment. The product in a powdered state can also be rehydrated by simple mixing with water and/or milk, and freezing to produce a product comparable with the original in texture and flavor. It should be understood that for best preservation when they are to be used per se (i.e., without chocolate or other candy coating), the dehydrated frozen products are stored in a manner to exclude atmospheric moisture, such as in hermetically sealed cans under nitrogen pack or laminated moisture-proof bags.

The following examples will illustrate the carrying out of the process of the present invention:

EXAMPLE 1

A blended mixture of about 50 percent by weight of sweetened fresh strawberries (3 to 1 fruit to sugar ratio) and 50 percent by weight sour cream was blended into a commercially available strawberry flavored gelatin dessert and the total formula chilled in the usual manner. The chilled product was initially frozen solid by further cooling to a temperature of about −10° Fahrenheit at about atmospheric pressure and then cut into slabs about ½ inch thick. These slabs were then placed in a freeze-drier chamber (Freeze-Dry Pilot—Model UPFD-X, Vacudyne Corp.) and the chamber pressure drawn down to a vacuum of about 0.3 millimeter of mercury (absolute) over a time period of about 10 minutes (hereinafter refered to as the "pull down" time). At the end of the pull down the product temperature was about −25° Fahrenheit. The heat in the drier platens was applied according to the following schedule of platen temperature and time while the pressure was maintained at or below about 0.5 millimeter of mercury absolute.

| Platen temperature, ° F. | Time |
| --- | --- |
| 150 | 3 hours. |
| 125 | 2 hours. |
| 100 | overnight (17 hours). |

Excellent results were obtained. The freeze-dried monoliths had a moisture content of less than about one percent, good body and fine flavor. They were ideally suited for coating with chocolate, caramel or other candy coating to make a candy bar or like candy piece.

EXAMPLE 2

A sweetened strawberry puree was prepared by intensive mixing of 300 parts by weight of cleaned fresh strawberries with 100 parts by weight of cane sugar, in a conventional blender. This puree was then blended in various proportions with a commercially available high temperature pasteurized (200–250° Fahrenheit for several seconds) synthetic sour cream containing about 18 percent by weight vegetable fat; 8–10 percent by weight milk solids, non-fat; small amounts of emulsifier, stabilizer and like conventional ingredients and balance water. Blending is readily accomplished in conventional manner using, e.g., hand stirring or a home-type blender.

| Parts by weight sour cream: | Parts by weight sweetened strawberry puree |
| --- | --- |
| (A) 75 | 25 |
| (B) 50 | 50 |
| (C) 25 | 75 |

The strawberry-sour cream blends were initially frozen solid to temperatures of about −10° Fahrenheit at atmospheric pressure to form monolithic slabs about 4 inches in diameter and ½ inch or less thick. These slabs were then dried in the freeze-drying unit of Example 1. Pull down time was 15 minutes at which time the product temperatures were about −20° Fahrenheit. The drying cycle was:

| Platen temperature, ° F. | Time |
| --- | --- |
| 100 | 30 minutes. |
| 150 | 45 minutes. |
| 200 | 3 hours, 15 minutes. |
| 150 | 2 hours, 28 minutes. |

The freeze-dried products were characterized as follows:

A—not quite dry; rather weak flavor; slightly weak body.
B—dry (less than about one percent moisture content); good strawberry flavor; good body.
C—dry (less than about one percent moisture content); excellent strawberry flavor; excellent firm, hard body.

The freeze-dried monolithic products were eminently suited for (among other things) use in chocolate coated candy bars and the like, either alone or together with such items as vanilla cookie wafers or the like.

EXAMPLE 3

Example 2 was repeated except for the substitution of a commercially available natural sour cream product for the synthetic sour cream used in Example 2 and for a slight variation in the drying cycle which was as follows (after an 8 minutes pull down time):

| Platen temperature, ° F. | Time |
| --- | --- |
| 200 | 3 hours, 15 minutes. |
| 175 | 45 minutes. |
| 150 | 2 hours. |
| 125 | 1 hour, 25 minutes. |

The characteristics of the dried monoliths were parallel to those in Example 2) better drying and better body with increasing concentration of strawberry puree). It was observed, however, that all products of this example had flavor much superior to that of the products made with synthetic sour cream, and were thus more preferred for use as a candy filler and the like.

The products of this invention may contain sour cream in proportions ranging from about 5 percent to about 75 percent by weight of the total mixture. As evident from the foregoing examples, one particularly preferred product is a sour cream-strawberry puree mixture containing about 25 to about 50 percent by weight sour cream.

The foregoing specific examples illustrate the invention as applied to certain specific products. It will be understood that the invention may be applied to other like products. Thus, for example, in addition to the specifically exemplified sour cream-strawberry puree mixture, it will be obvious that the invention can be used in the production of such freeze-dried products as sour cream-fruit, fruit puree, or berry mixtures containing blueberry, blackberry, raspberry, apple, banana, peach, plum, grape or the like. It is also to be understood that these products can be used in ways other than those specifically described. In sum, it is intended that the scope of the invention be limited only as indicated by the appended claims. Thus, for example, it will be apparent that coating materials other than candy coatings may be used to protect the freeze-dried products from atmospheric moisture. Many edible coating materials which would serve such purposes are known to the art, e.g., gelatin, sodium carboxymethyl cellulose, methyl cellulose, hydroxy propyl methyl cellulose and the like. Products thus coated can be used, for example, as additives for dry cereals; as food for astronauts, etc.

What is claimed is:

1. Process for preparing a rehydratable freeze-dried food product selected from the group consisting of sour cream-fruit and sour cream-berry mixtures which comprises cooling a monolithic shape of the said product at about atmospheric pressure, thereby avoiding foaming, to a temperature at which it is a hard-frozen solid and then dehydrating said hard-frozen solid shape to a moisture content of less than about 4 percent by applying heat thereto at reduced pressures of less than about 1.5 millimeters of mercury (absolute) while controlling the rate of heat application so as to maintain the hard-frozen solid portion of said product in the hard-frozen state until dehydration is essentially complete.

2. Process of claim 1 wherein said food product is a sour cream-strawberry puree mixture.

3. Process of claim 1 including the additional step of applying to the dehydrated product a continuous enveloping coating of an edible coating material.

4. Process of claim 3 wherein said edible coating material is candy chocolate.

References Cited

UNITED STATES PATENTS

| | | | |
|---|---|---|---|
| 1,127,114 | 2/1915 | Thompson | 99—138 |
| 3,321,319 | 5/1967 | Hackenberg | 99—199 |

OTHER REFERENCES

Smith, Freeze Drying of Foodstuffs, Baker's Review (London) v. 78, pp. 573–574, April 1961.

RAYMOND N. JONES, Primary Examiner

J. M. HUNTER, Assistant Examiner

U.S. Cl. X.R.

99—83, 134, 201, 204